United States Patent
Tremel et al.

(10) Patent No.: US 8,872,455 B2
(45) Date of Patent: Oct. 28, 2014

(54) METHOD AND CONTROLLER FOR AN ELECTRIC MOTOR WITH FAULT DETECTION

(75) Inventors: Chris J Tremel, West Fargo, ND (US); Eric Vilar, Dubuque, IA (US)

(73) Assignee: Deere & Company, Moline, IL (US)

( * ) Notice: Subject to any disclaimer, the term of this patent is extended or adjusted under 35 U.S.C. 154(b) by 103 days.

(21) Appl. No.: 13/477,460

(22) Filed: May 22, 2012

(65) Prior Publication Data

US 2013/0314014 A1    Nov. 28, 2013

(51) Int. Cl.
| | | |
|---|---|---|
| *H02P 6/12* | (2006.01) | |
| *H02M 7/5387* | (2007.01) | |
| *H02P 23/00* | (2006.01) | |

(52) U.S. Cl.
USPC ...... 318/400.22; 363/132; 318/504; 318/800; 318/801; 318/802; 361/30

(58) Field of Classification Search
CPC . H02H 7/1227; H02H 7/0833; H02H 11/005; H02P 6/12
USPC .................. 361/23–34; 318/400.22
See application file for complete search history.

(56) References Cited

U.S. PATENT DOCUMENTS

| | | | |
|---|---|---|---|
| 4,023,083 | A | 5/1977 | Plunkett |
| 4,814,677 | A | 3/1989 | Plunkett |
| 5,428,283 | A | 6/1995 | Kalman et al. |
| 5,486,748 | A | 1/1996 | Konrad et al. |
| 5,914,582 | A | 6/1999 | Takamoto et al. |
| 6,275,000 | B1 | 8/2001 | Nishimura |
| 6,335,608 | B1 | 1/2002 | Takahashi |
| 6,710,564 | B2 * | 3/2004 | Shibuya et al. .......... 318/400.22 |
| 7,045,988 | B2 | 5/2006 | Ha et al. |
| 7,109,605 | B2 * | 9/2006 | Habu .............................. 307/39 |
| 7,157,878 | B2 | 1/2007 | Collier-Hallman |
| 7,271,993 | B2 | 9/2007 | Plojhar et al. |
| 7,733,044 | B2 | 6/2010 | Nakamura et al. |
| 2002/0172062 | A1 * | 11/2002 | Furukawa et al. ............ 363/132 |
| 2006/0028261 | A1 | 2/2006 | Hsieh et al. |

(Continued)

FOREIGN PATENT DOCUMENTS

| | | |
|---|---|---|
| JP | 2002204150 | 7/2002 |
| JP | 2010211949 | 9/2010 |

OTHER PUBLICATIONS

US 7,595,604, 9/2009, Tomigashi (withdrawn).

(Continued)

*Primary Examiner* — Eduardo Colon Santana
*Assistant Examiner* — Zemenay Truneh

(57) ABSTRACT

For each phase of a controller, semiconductor switches comprise a high side switch and a low side switch. A direct current voltage bus provides electrical energy to the semiconductor switches. A measuring circuit is adapted to measure the collector-emitter voltage or drain-source voltage for each semiconductor switch of the controller. A data processor determines that a short circuit in a particular semiconductor switch is present if the measured collector-emitter voltage or measured source-drain voltage for the particular semiconductor switch is lower than a minimum threshold and if an observed current associated with the particular semiconductor switch has an opposite polarity from a normal operational polarity. A driver simultaneously activates counterpart switches of like direct current input polarity that are coupled to other phase windings of the electric motor, other than the particular semiconductor switch, to protect the electric motor from potential damage associated with asymmetric current flow.

20 Claims, 9 Drawing Sheets

(56) References Cited

U.S. PATENT DOCUMENTS

| | | |
|---|---|---|
| 2006/0232896 A1 | 10/2006 | Maue et al. |
| 2006/0247829 A1 | 11/2006 | Sato |
| 2010/0188033 A1 | 7/2010 | Daboussi et al. |
| 2010/0208407 A1 | 8/2010 | Maraval |
| 2011/0285334 A1 | 11/2011 | Donner et al. |
| 2012/0046813 A1 | 2/2012 | Schleser et al. |
| 2012/0146567 A1* | 6/2012 | Iwaji et al. .................. 318/504 |

OTHER PUBLICATIONS

Elbuluk, Malik E. et al. Speed Sensorless Induction Motor Drives for Electrical Actuators: Schemes, Trends and Tradeoffs, NASA Technical Memorandum 107466. retrieved from the Internet:>. URL:http://www.esat.kuleuven.be/electa/publications/fulltexts/pub_479.pdf.

Van Haute, S. et al. Design and Control of a Permanent Magnet Synchronous Motor Drive for a Hybrid Electric Vehicle. Retrieved from the Internet:<URL:http://www.esat.kuleuven.be/electa/publications/fulltext/pub_444.pdf>.

Welchko; Jahns; Soong; and Nagashima. IPM Synchronous Machine Drive Response to Symmetrical and Asymmetrical Short Circuit Faults. IEEE Transactions on Energy Conversion. vol. 18, No. 2., Jun. 2003.

Shekhawat and Brockway, IGBT Behavior under Short Circuit and Fault Protection Using Two-Step Soft Turn Off Gate Driver. Fairchild Semiconductor. May 2008.

The International Search Report and the Written Opinion of the International Searching Authority, dated Apr. 29, 2013 (8 pages).

* cited by examiner

| | Current Polarity | High Side Gate Command | Low Side Gate Command | High Side VCE | Low Side VCE | Condition | Response |
|---|---|---|---|---|---|---|---|
| | 901 | 902 | 903 | 904 | 905 | 906 | 907 |
| 951 | - | 0 | 0 | 0 | 0 | Invalid condition | - |
| 952 | - | 0 | 0 | 0 | 1 | Shorted IGBT or diode on low side | Turn all high side off, turn all low sides on |
| 953 | - | 0 | 0 | 1 | 0 | High side diode conducting | No fault |
| 954 | - | 0 | 0 | 1 | 1 | Invalid condition | - |
| 955 | + | 0 | 0 | 0 | 0 | Invalid condition | - |
| 956 | + | 0 | 0 | 0 | 1 | Low side diode conducting | No fault |
| 957 | + | 0 | 0 | 1 | 0 | Shorted IGBT or diode on high side | Turn all high side off, turn all low sides on |
| 958 | + | 0 | 0 | 1 | 1 | Invalid condition | - |

METHOD AND CONTROLLER FOR AN ELECTRIC MOTOR WITH FAULT DETECTION

FIELD OF THE INVENTION

This invention relates to a method and controller for electric motor with fault detection.

BACKGROUND OF THE INVENTION

An electric motor may feature a rotor with permanent magnets and a stator, such as an interior permanent magnet (IPM) motor or an IPM synchronous motor. In accordance with certain prior art, an inverter or motor controller comprises semiconductor switches that support the provision of alternating current outputs for one or more phases of the electric motor. A short circuit, which appears across the output terminals of one semiconductor switch, may cause an asymmetric current to flow in the windings of an electric motor. The asymmetric current makes the motor susceptible to damage, such as demagnetization of one or more permanent magnets within the motor (e.g., or its rotor). Thus, there is a need for an improved method and controller for an electric motor with fault detection.

SUMMARY OF THE INVENTION

In accordance with one embodiment, a method and system is presented for fault detection or prevention in a controller for an electric motor. For each phase of a controller, a pair of semiconductor switches comprises a high side switch and a low side switch. A direct current voltage bus provides electrical energy to the semiconductor switches (e.g., switchably via a direct current power switch). A measuring circuit is adapted to measure the collector-emitter voltage or drain-source voltage for each semiconductor switch of the controller. A data processor determines that a short circuit in a particular semiconductor switch is present if the measured collector-emitter voltage or measured source-drain voltage for the particular semiconductor switch is lower than a minimum threshold (e.g., during a commanded off-state of the particular semiconductor switch or over at least one complete cycle or waveform of an inverter driver signal) and if an observed current associated with the particular semiconductor switch has an opposite polarity from a normal operational polarity. A driver simultaneously activates counterpart switches of like direct current input polarity that are coupled to other phase windings of the electric motor, other than the particular semiconductor switch, to protect the electric motor from potential damage associated with asymmetric current flow (e.g., prevent demagnetization of the permanent magnets in the electric motor).

BRIEF DESCRIPTION OF THE DRAWINGS

FIG. 9 is an illustrative table of voltage states of semiconductor switches, corresponding output current for phase output nodes, corresponding faults detected, and corresponding corrective actions.

DESCRIPTION OF THE PREFERRED EMBODIMENT

An asymmetric current flow in the windings (44, 46, and 48) of a motor 45 refer to a condition where a direct current (e.g., positive current or negative current) or direct current offset from one or more direct current terminals (64, 66) is continuously applied to only one winding (44, 46, or 48) or one phase of the motor 45. The asymmetric current flow may be referred to as an unbalanced current flow. For example, the asymmetric current flow may result from a fault or short circuit in a single semiconductor switch of an inverter or controller. For certain motor 45 designs, an asymmetric current flow or unbalanced current flow may place the one or more motor windings (44, 46, or 48) under thermal stress, may partially demagnetize permanent magnets of the motor 45 over an extended period of time, or may make the motor 45 susceptible to reduced longevity, among other things. For example, the continuous input of direct current or a direct current offset to a winding (44, 46, or 48) can result in thermal stress or damage to the winding (44, 46, or 48) that is typically rated or designed for alternating current input, or the discontinuous input of electrical energy. Further, because one phase winding (44, 46, or 48) has a direct current offset from the other phase windings that is not coordinated with the frequency of the alternating current applied to the other phases, the direct current offset can damage the motor 45 or electrical machine, or demagnetize its permanent magnets over time.

Figure 1:
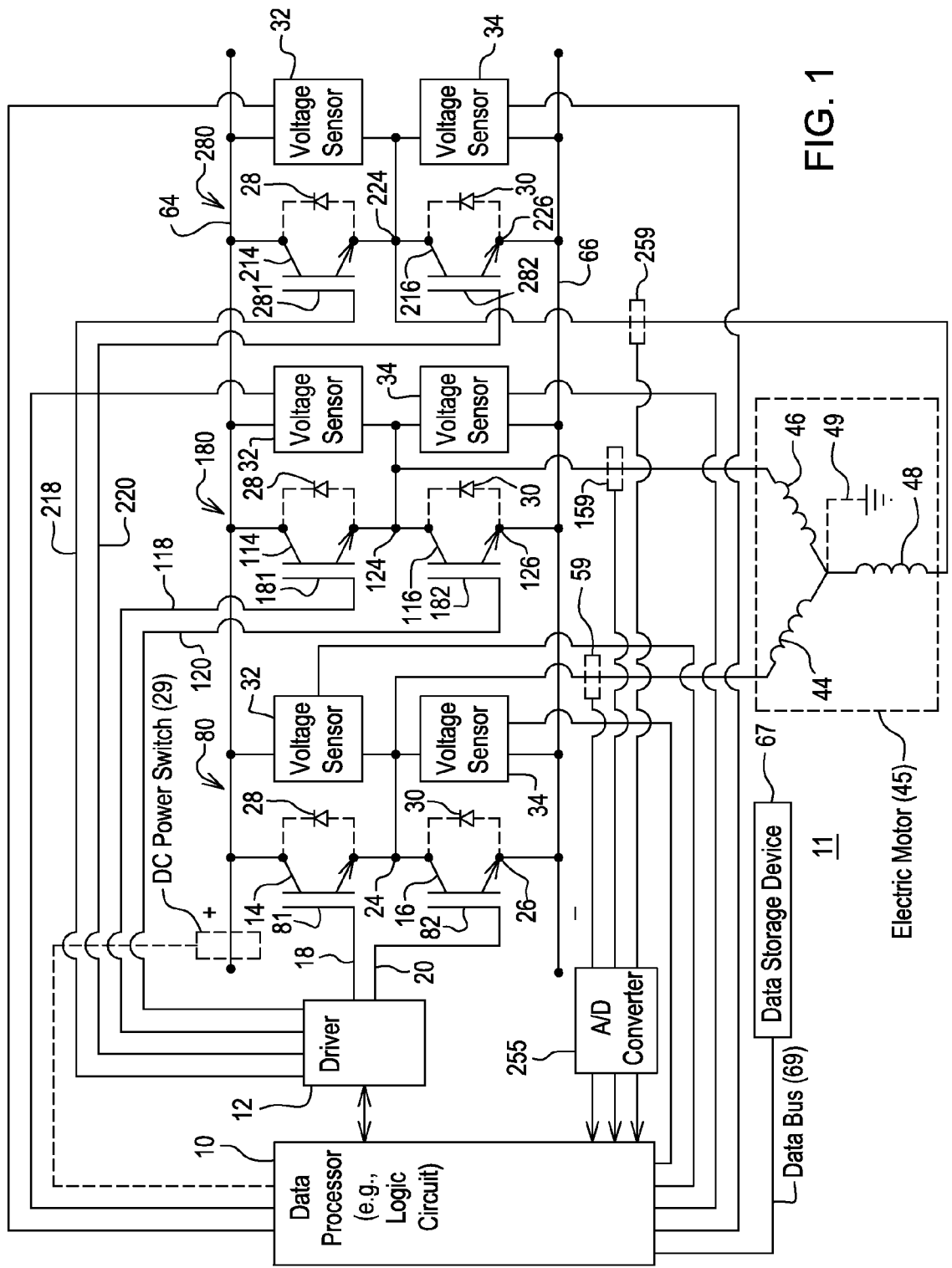
FIG. 1 is a block diagram of one embodiment of method and controller for electric motor with fault detection.

In accordance with one embodiment, FIG. 1 discloses a system, inverter or controller 11 for controlling an electric motor 45, where the controller 11 is capable of fault detection and prevention measures. The electric motor 45 may comprise an interior permanent magnet (IPM) motor 45 or another alternating current machine. As illustrated, the system, aside from the motor 45, may be referred to as an inverter or a motor controller 11 with fault detection.

In FIG. 1, the data processor 10 is coupled to a driver 12. The driver 12 comprises a semiconductor drive circuit that drives or controls semiconductor switches (81, 82, 181, 182, 281, or 282) to generate control signals for an inverter circuit. The inverter circuit (80, 180 and 280) converts a direct current input signal from a direct current bus (64, 66) to one or more alternating current output signals at output terminals (24, 124, and 224). The direct current bus (64, 66) provides electric energy to the controller or inverter, including its semiconductor switches. In turn, the inverter circuit is coupled to the motor 45 or motor windings (44, 46, and 48). Although the motor windings (44, 46, and 48) are illustrated as Wye (Y) fed configuration for illustrative purposes with a central ground connection 49, other arrangements are possible and fall within the scope of the claims.

In FIG. 1, the semiconductor switches (81, 82, 181, 182, 281, or 282) for the multiple phases (e.g., first phase 80, second phase 180 and third phase 280) collectively form an inverter circuit in which direct current inputted to the inverter circuit is inverted or transformed into one or more alternating current output signals for application to a corresponding phase or winding (44, 46, or 48) of the electric motor 45.

The inverter circuit comprises power electronics, such as switching semiconductors (81, 82, 181, 182, 281, or 282) to generate, modify and control pulse-width modulated signals or other alternating current signals (e.g., pulse, square wave, sinusoidal, or other waveforms) applied to the motor 45. An output stage of the inverter circuit provides a pulse-width modulated signal or other alternating current signal for control of the motor 45.

For each output phase (80, 180, and 280), the controller 11 or inverter comprises a pair of semiconductor switches (81, 82, 181, 182, 281, or 282). In one embodiment, the semiconductor switches (81, 82, 181, 182, 281, or 282) may comprise insulated gate bipolar transistors (IGBT), field effect transistors, power transistors, or other semiconductor devices.

First, the controller 11 or inverter comprises a first pair of semiconductor switches (81, 82) including a high side switch (81) and a low side switch (82) for a first phase 80 of the controller 11. In the first phase 80, the high side switch (81) may be referred to as a high side switch because one of its switched output terminals (e.g., collector 14 or drain, among output terminals (14, 24)) may be connected to a positive direct current terminal 64 of the direct current bus. The low side switch (82) may be referred to as a low side switch because one of its switched output terminals (e.g., emitter 26 or source, among output terminals (16, 26)) may be connected to a negative direct current terminal 66 of the direct current bus.

Second, the controller 11 or inverter comprises a second pair of semiconductor switches (181, 182) including a high side switch (181) and a low side switch (182) for a second phase (180) of the controller. In the second phase 180, the high side switch (181) may be referred to as a high side switch because one of its switched output terminals (e.g., collector 114 or drain, among output terminals (114, 124)) may be connected to a positive direct current terminal 64 of the direct current bus. The low side switch (182) may be referred to as a low side switch because one of its switched output terminals (e.g., emitter 126 or source, among output terminals (116, 126)) may be connected to a negative direct current terminal 66 of the direct current bus.

Third, the controller or inverter comprises a third pair of semiconductor switches including a high side switch and a low side switch for a second phase of the controller. In the third phase 280, the high side switch (281) may be referred to as a high side switch because one of its switched output terminals (e.g., collector 214 or drain, among output terminals (214, 224)) may be connected to a positive direct current terminal 64 of the direct current bus. The low side switch (282) may be referred to as a low side switch because one of its switched output terminals (e.g., emitter 226 or source, among output terminals (216, 226)) may be connected to a negative direct current terminal 66 of the direct current bus.

Figure 2:
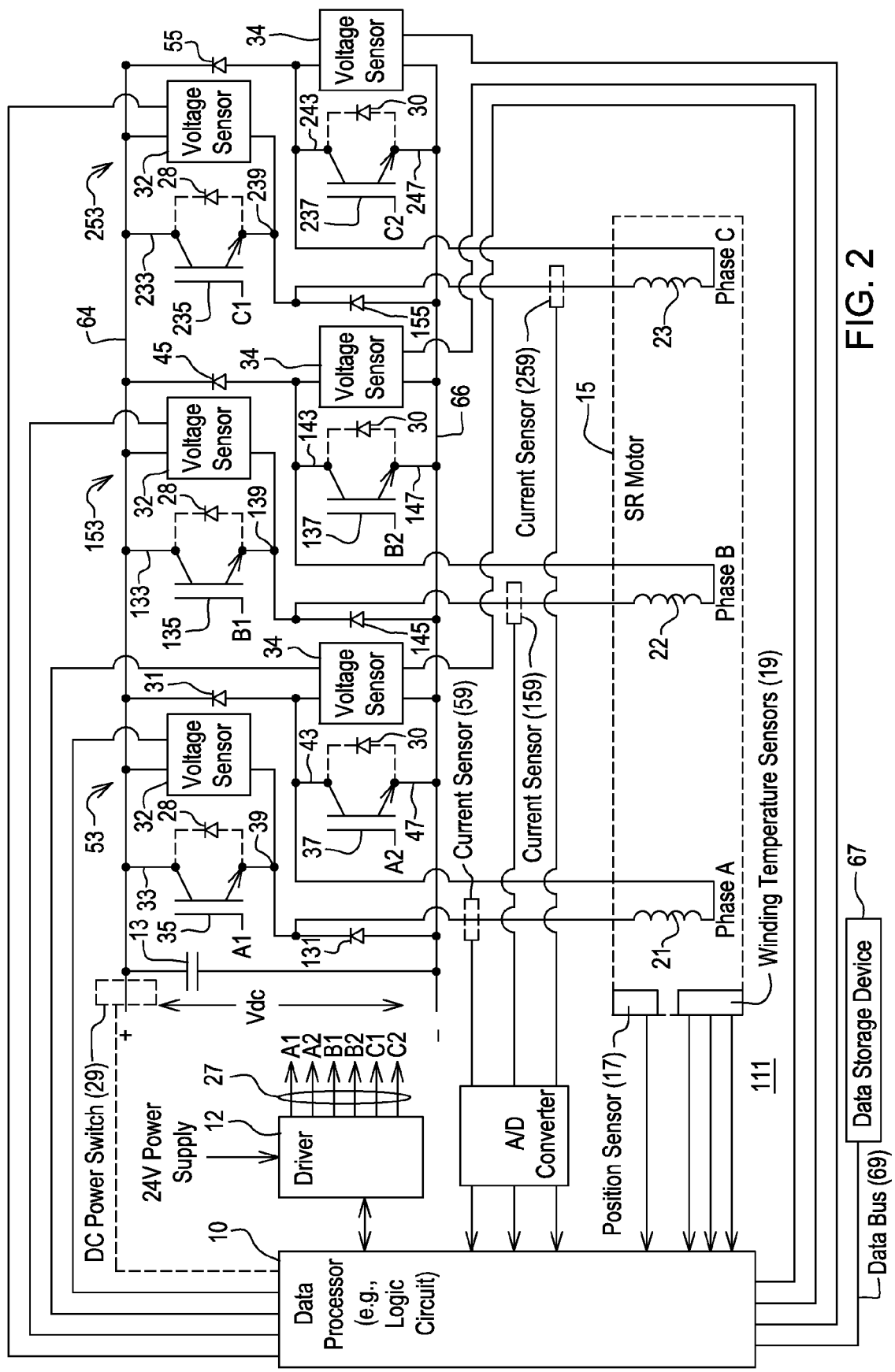
FIG. 2 is a block diagram of another embodiment of method and controller for electric motor with fault detection.

Although FIG. 1 and FIG. 2 each illustrate a three-phase controller for controlling an electric motor 45, a controller may generally have one or more phases and a controller with two or more phases may be used to practice any embodiment of this disclosure.

In one embodiment, the inverter circuit, inverter or controller 11 is powered by a direct current (DC) voltage bus (64, 66, collectively). For example, in FIG. 1 a direct current voltage bus (64, 66) is coupled to collector and emitter terminals or source and drain terminals of the semiconductor switches (81, 82, 181, 182, 281, or 282) for each phase. The input terminal (18, 20, 118, 120, 218, and 220) of each semiconductor switch (81, 82, 181, 182, 281, or 282) is coupled to the driver 12. The input terminal (18, 20, 118, 120, 218, and 220) of each semiconductor switch may comprise a gate or a base, for example. The output terminal (24, 124, 224) of each semiconductor switch is coupled to a terminal of a motor winding (44, 46, or 48). The output terminal (24, 124, 224) of each phase may be located at the junction of the high side switch and the low side switch for a particular phase. Each different phase (80, 180, 280) of the motor 45 may be associated with a corresponding motor 45 winding (44, 46, or 48).

As shown in FIG. 1, a protecting diode (28, 30) may be coupled between the collector and emitter (or the source and drain) of each semiconductor switch (81, 82, 181, 182, 281, or 282) to limit the current flowing in between the collector and emitter (or output terminals) during transient states in which the semiconductor switch is deactivated or activated.

A measuring circuit or voltage sensor (32, 34) is coupled between the collector and emitter terminals or the source and drain terminals of the semiconductor switches (81, 82, 181, 182, 281, or 282) for each phase (80, 180, 280). Each voltage sensor (32, 34) is adapted to measure the collector-emitter voltage or source-drain voltage for each semiconductor switch of the controller 11. If the detected collector-emitter voltage or source-drain voltage for an inactive (e.g., switched off) semiconductor switch (81, 82, 181, 182, 281, or 282) is less than a threshold voltage level, the semiconductor device (81, 82, 181, 182, 281, or 282) may have a short circuit or a greater than typical leakage current, which potentially indicates an imminent short circuit failure mode of the semiconductor device. The data processor 10 may use the output of one or more voltage sensors (32, 34) to estimate the current flowing within a respective winding (44, 46, or 48) for a corresponding phase of the inverter or controller 11.

Each voltage sensor (32, 34) or measuring circuit provides a high input impedance relative to the semiconductor switch (81, 82, 181, 182, 281, or 282) and the motor winding (44, 46, or 48) such that the voltage sensor (32, 34) or the measuring circuit does not perturb the performance of the semiconductor switch or draw material current (e.g., emitter current or collector current) from the semiconductor switch or the winding (44, 46, or 48). In one embodiment, the voltage sensor (32, 34) or the measuring circuit may comprise a high impedance voltage meter or voltage sensor. For example, the measuring circuit may comprise a high impedance voltage sensor that uses one or more operational amplifiers for comparison of an input voltage to a reference voltage. The reference voltage may be provided by a battery, a voltage regulator, or a Zener diode, for example. In one configuration, the output of the voltage sensor may be coupled to an analog-to-digital converter to provide a suitable digital input for the data processor 10.

The measuring circuit or voltage sensor (32, 34) may provide an analog output or a digital output. As shown in FIG. 1 each voltage sensor (32, 34) is coupled to the data processor 10 to provide a digital output thereto. If the voltage sensor (32, 34) or measuring circuit provides an analog output, an analog-to-digital converter may be interposed between the voltage sensor (32, 34) and the inputs of the data processor 10. The measuring circuit or voltage sensor (32, 34) is capable of detecting greater than normal leakage current when the semiconductor switch (81, 82, 181, 182, 281, or 282) is deactivated or turned off. Accordingly, the measuring circuit or voltage sensor is well suited for providing an early warning of a later complete fault or short circuit in the semiconductor switch or protecting diode (28, 30), such that current initially associated with the early detected short circuit or fault may be insufficient to damage the motor 45 or electrical machine. In some cases, the data processor 10 may lower (e.g., slightly, but with suitable bias to activate or turn on the switch) the input voltage to the gate or base input of the semiconductor switch (82, 181, 182, 281, or 282) with a greater than typical or normal leakage current to ensure the semiconductor device is operating within a desired operational zone that minimizes any fault or short circuit current in the switched output terminals of the semiconductor device.

In one configuration, current sensors (59, 159, 259) are coupled to corresponding terminals (24, 124, 224) of the respective phase output nodes. Each current sensor (59, 159, 259) measures or senses current magnitude at the phase output node, the polarity (e.g., sense or direction) of the current flowing at the phase output node, or both (collectively or individually "measured current"). If the current sensor (59, 159, 259) provides an analog output of the measured current, the analog output of each current sensor (59, 159, 259) is coupled to an analog-to-digital converter 255 that is interposed between the current sensor output and the data processor 10. Here, the connections between the analog-to-digital converter 255 and the current sensors (59, 159, 259) are illustrated by the mating pairs of arrows with common reference letters, A, B, and C in FIG. 1. However, if the current sensor (59, 159, 259) provides a digital output of the measured current in an alternate embodiment, the analog-to-digital converter 255 can be omitted, where the current sensor output is connected directly to the data processor 10, or via buffer memory.

Each current sensor (59, 159 and 259) provides an indicator (e.g., current polarity indicator, current magnitude, or both) of the measured current indicative of whether or not the measured or observed phase output node current (associated with a motor winding (e.g., 44, 46, 48) coupled to the particular semiconductor switch) has an opposite polarity from a normal operational polarity. The observed current polarity may be different or opposite from the normal operational polarity if any of the semiconductor switches or diodes (28, 30) fails as a short circuit or breaks down from the flow of reverse current or current of opposite polarity to the normal current, for example.

Although one current sensor (59, 159, 259) per phase output node (e.g., 24, 124, 224) is shown in FIG. 1, in an alternate embodiment the total number of current sensors may be limited to N−1, where N is equal to the number of phases of the electric motor 45. In such an alternate embodiment, the data processor 10 is adapted to estimate or calculate the observed current in the phase output node (e.g., terminal 24) without a sensor from the other output nodes with sensors (e.g., two current sensors 59, 159) in accordance with electrical network analysis, such as Kirchhoffs law.

The driver 12 provides digital signals for activating the semiconductor switches (82, 181, 182, 281, or 282) in accordance with a desired input signal or control signals from the data processor 10. For example, during operation of the motor 45 in an operational mode, the input signal may comprise a sinusoidal signal, a square wave signal or another signal. During a diagnostic mode or a test mode, the input signal may provide input signals or control signals to selectively activate one or more of the semiconductor switches (82, 181, 182, 281, or 282) to prevent damage to motor winding (44, 46, or 48)s or permanent magnets of the motor 45.

In one embodiment, the data processor 10 may comprise an electronic data processor, a microprocessor, a microcontroller, a programmable logic array, a logic circuit, an arithmetic logic unit, an application specific integrated circuit, a digital signal processor, a proportional-integral-derivative (PID) controller, or another data processing device. Further, the data processor 10 may be coupled to a data storage device 67 via a data bus 69.

The data storage device 67 may comprise electronic memory, nonvolatile random access memory, an optical storage device, a magnetic storage device, a hard disk drive, an optical disc drive, or another device for storing digital data or analog data. The data storage device 67 may store a look-up table, data base, file, inverted file, or another data structure with voltage threshold levels that indicate a short circuit or fault in a semiconductor switch (82, 181, 182, 281, or 282) and corresponding switch states to be activated in the event of a fault or short circuit of a particular semiconductor switch (82, 181, 182, 281, or 282).

In one illustrative example, the data processor 10 determines that a short circuit in a particular semiconductor switch is present if the measured collector-emitter voltage or measured source-drain voltage for the particular semiconductor switch is lower than a minimum threshold (e.g., over at least one complete cycle or waveform of an inverter driver 12 signal) or approaches zero volts over a sampling period. If a fault or short is detected in the particular semiconductor switch, a driver 12, or logic control circuit therein, simultaneously activates counterpart switches of like direct current input polarity (e.g., all low side switches (82, 182, 282) or all high side switches (81, 181, 281)) that are coupled to other phase windings (44, 46, or 48) of the electric motor 45, other than the particular semiconductor switch to prevent damage to the motor 45, such as the motor windings (44, 46, or 48) or demagnetization of the permanent magnets in the electric motor 45. For example, switches (e.g., counterpart switches) of like direct current input polarity means semiconductor switches that are connected to the direct current bus in the same manner or a substantially similar manner with respect to their output terminals (e.g., collector and emitter terminals of transistors with same junction materials biased in the same general manner and with the same polarity).

In one example of executing a protective measure to prevent damage to the motor 45, the data processor 10 instructs the driver 12 to simultaneously activate (e.g., turn on) all high side semiconductor switches for each phase if the data processor 10 detects a short or fault in one high side semiconductor switch via sensor data from the voltage sensor (32, 34). Conversely, in another example, the data processor 10 instructs the driver 12 to simultaneously activate (e.g., turn on) all low side semiconductor switches for each phase if the data processor 10 detects a short or fault in one low side semiconductor switch. The data processor 10 may keep the simultaneously activation of the semiconductor switches (e.g., high side switches or low side switches) until the direct current bus is switched off, deactivated, or less than a threshold voltage level (e.g., 60 Volts direct current), where the threshold voltage level is a motor 45-dependent or machine-dependent variable that is selected to avoid damage to the motor 45. Further, the data processor 10 may keep the activation of the counterpart switches of like direct current input polarity, until the power to the inverter is recycled, or until the direct current power switch 29 is cycled off and on at least once.

FIG. 2 illustrates an alternative embodiment of a controller 111 or inverter with fault detection for controlling an electric motor 45. For example, the controller 11 or inverter of FIG. 2 is well suited for controlling a switched reluctance motor 15. The controller 111 or inverter of FIG. 2 is different from FIG. 1 because of various modifications that facilitate control of a switched reluctance motor 15. For example, the inverter circuit (53, 153 and 253 collectively) of FIG. 2 features additional diodes (31, 45, 55) and does not have an output that is formed by connection of the output terminals of a low side semiconductor switch and a high side semiconductor switch. Further, the controller 111 of FIG. 2 has current a rotor or shaft position sensor 17, and one or more winding temperature sensors 19, among other things. Like reference numbers in FIG. 1 and FIG. 2 indicate like elements.

In FIG. 2, the data processor 10 is coupled to a driver 12. The driver 12 comprises a semiconductor drive circuit that drives or controls switching semiconductors (35, 37, 135, 137, 235, 237) to generate control signals for each phase (e.g., 53, 153, 253) of an inverter circuit. As illustrated, the inverter circuit comprises the circuitry and semiconductor switches (35, 37, 135, 137, 235, 237) associated with a first phase 53 ("Phase A"), a second phase 153 ("Phase B") and a third phase 253 ("Phase C"). The inverter circuit converts a direct current input signal from a direct current bus (64, 66 collectively) to one or more alternating current output signals for output at output terminals (39, 43, 139, 143, 239, and 243). In turn, the inverter circuit is coupled to the motor 15 or motor windings (21, 22 and 23). The controller 111 of FIG. 2 comprises a controller for a switched reluctance motor 15 with three separate windings (21, 22, and 23) for three corresponding phases: Phase A, Phase B and Phase C.

In FIG. 2, the semiconductor switches (35, 37, 135, 137, 235, 237), protecting diodes (28, 30), supplemental diodes (31, 45, 55, 131, 145, 155), voltage sensors (32, 34) for the multiple phases (53, 153, 253) collectively form an inverter circuit in which direct current voltage inputted to the inverter circuit is inverted or transformed into one or more alternating current output signals for application to a corresponding phase or winding (21, 22, or 23) of the electric motor 15. The inverter circuit comprises power electronics, such as switching semiconductors (35, 37, 135, 137, 235, 237) to generate, modify and control pulse-width modulated signals or other alternating current signals (e.g., pulse, square wave, sinusoidal, or other waveforms) applied to the motor 15. An output stage of the inverter circuit provides a pulse-width modulated signal or other alternating current signal for control of the motor 15.

For each output phase (53, 153, 253) the controller 111 or inverter comprises a pair of semiconductor switches (e.g., a first pair 35, 37; a second pair 135, 137, and a third pair 235, 237). Each semiconductor switch (35, 37, 135, 137, 235, 237) may comprise an insulated gate bipolar transistor (IGBT), a field effect transistor, a power transistor, or another semiconductor device.

First, in the first phase 53 ("Phase A") the controller 111 or inverter comprises a first pair of semiconductor switches (35, 37) including a high side switch 35 with its output terminals (33, 39) coupled in series with a low side diode 131 and a low side switch 37 with its output terminals (43, 47) coupled in series with a high side diode 31 for the first phase 53 of the controller 111. For the first phase 53, a high side semiconductor switch 35 has its output terminals (33, 39) coupled in parallel with a protecting diode 28 and a voltage sensor 32, whereas a low side semiconductor switch 37 has its output terminals (43, 47) coupled in parallel with a protecting diode 30 and voltage sensor 34.

Second, in the second phase 153 ("Phase B") the controller 111 or inverter comprises a first pair of semiconductor switches (135, 137) including a high side switch 135 with its output terminals (133, 139) coupled in series with a low side diode 145 and a low side switch 137 with its output terminals (143, 147) coupled in series with a high side diode 45 for the second phase 153 of the controller 111. For the second phase 153, a high side semiconductor switch 135 has its output terminals (133, 139) coupled in parallel with a protecting diode 28 and a voltage sensor 32, whereas a low side semiconductor switch 137 has its output terminals (143, 147) coupled in parallel with a protecting diode 30 and voltage sensor 34.

Third, in the third phase 253 ("Phase C") the controller 111 or inverter comprises a first pair of semiconductor switches (235, 237) including a high side switch 235 with its output terminals (233, 239) coupled in series with a low side diode 155 and a low side switch 237 with its output terminals (243, 247) coupled in series with a high side diode 55 for the third phase 253 of the controller 111. For the third phase 253, a high side semiconductor switch 235 has its output terminals (233, 239) coupled in parallel with a protecting diode 28 and a voltage sensor 32, whereas a low side semiconductor switch 237 has its output terminals (243, 247) coupled in parallel with a protecting diode 30 and voltage sensor 34.

As used throughout this document, the output terminals comprise controlled or switched terminals, such as the collector and emitter of a semiconductor switch, or the drain and source of a field effect transistor. Similarly, as used herein, the control terminals comprise a base of a transistor or gate of a field effect transistor. Although FIG. 1 and FIG. 2 each illustrate a three-phase controller for controlling an electric motor (45 or 15), a controller may generally have one or more phases and a controller with two or more phases may be used to practice any embodiment of this disclosure.

In one embodiment, the inverter circuit or inverter is powered by a direct current (DC) voltage bus (64, 66 collectively). For example, in FIG. 2 a direct current voltage bus (64, 66) is coupled to collector and emitter terminals of each pair of semiconductor switches, or source and drain terminals of the semiconductor switches for each phase. A capacitor 13, such as an electrolytic capacitor may be coupled between the voltage rails or terminals of the direct current voltage bus (64, 66) to smooth or reduce ripple (e.g., an alternating current component) in the direct current or to otherwise filter the direct current.

The input terminal or control terminal (A1, A2, B1, B2, C1, C2) of each semiconductor switch (35, 37, 135, 137, 235, 237) is coupled to the driver 12. The input terminal or control terminal of each semiconductor switch (35, 37, 135, 137, 235, 237) may comprise a gate or a base, for example. The output terminal of each semiconductor switch is coupled to a terminal of a motor 15 winding (21, 22, or 23). Each different phase of the motor 15 may be associated with a corresponding motor winding (21, 22, or 23).

A first terminal of a first motor winding 21 (for Phase A) may be coupled to an emitter or output terminal 39 of the high side semiconductor switch 35 of the first phase 53 and second terminal of the winding 21, opposite of the first terminal, may be coupled to a collector or output terminal 43 of a low side semiconductor switch 37 of the first phase 53. A first terminal of a second motor winding 22 (for Phase B) may be coupled to an emitter or output terminal 139 of the high side semiconductor switch 135 of the second phase 153 and second terminal of the winding 22, opposite of the first terminal, may be coupled to a collector or output terminal 143 of a low side semiconductor switch 137 of the second phase 153. A first terminal of a third motor winding 23 (for Phase C) may be coupled to an emitter or output terminal 239 of the high side semiconductor switch 235 of the third phase 253 and second terminal of the winding 23, opposite of the first terminal, may be coupled to a collector or output terminal 243 of a low side semiconductor switch 237 of the third phase 253.

As shown in FIG. 2, a protecting diode (28, 30) may be coupled between the collector and emitter (or the source and drain) of each semiconductor switch (35, 37, 135, 137, 235, 237) to limit the current flowing in between the collector and emitter during transient states in which the semiconductor switch is deactivated (e.g., switched off) or activated (e.g., switched on).

A high side voltage sensor 32 or measuring circuit is coupled between the output terminals (33, 39, 133, 139, 233, 239) of each high side semiconductor switch, where the output terminals may comprise collector and emitter terminals or the source and drain terminals of the semiconductor switches for each phase (53, 153, 253). A low side voltage sensor 34 or measuring circuit is coupled between the output terminals (43, 47, 143, 147, 243, 247) of each high side semiconductor switch, where the output terminals may comprise collector and emitter terminals or the source and drain terminals of the semiconductor switches for each phase (53, 153, 253). The voltage sensors (32, 34) are adapted to measure the collector-emitter voltage or source-drain voltage for each semiconductor switch of the controller 111. Each high side voltage sensor 32 or measuring circuit provides a high input impedance relative to the high side semiconductor switch (35, 135, 235) and the windings such that the voltage sensor 32 or measuring circuit does not perturb the performance of the semiconductor switch or draw material current (e.g., emitter current or collector current) from the semiconductor switch. Each low side voltage sensor 34 or measuring circuit provides a high input impedance relative to the low side semiconductor switch (37, 137, 237) and the windings such that the voltage sensor 34 or measuring circuit does not perturb the performance of the semiconductor switch or draw material current (e.g., emitter current or collector current) from the semiconductor switch. In one embodiment, the voltage sensor (32, 34) or measuring circuit may comprise a high impedance voltage meter or voltage sensor. For example, the measuring circuit may comprise a high impedance voltage sensor that is uses one or more operational amplifiers for comparison of an input voltage to a reference voltage.

The voltage sensor (32, 34) or measuring circuit may provide an analog output or a digital output. As shown in FIG. 2 each measuring circuit is coupled to the data processor 10 to provide a digital output thereto. If the voltage sensor (32, 34) measuring circuit provides an analog output, an analog-to-digital converter may be interposed between the voltage sensor (32, 34) and the inputs of the data processor 10.

The driver 12 provides digital signals for activating the semiconductor switches (35, 37, 135, 137, 235, 237) in accordance with a desired input signal or control signals from the data processor 10. For example, during operation of the motor 15 in an operational mode, the input signal may comprise a sinusoidal signal, a square wave signal or another signal. During a diagnostic mode or a test mode, the input signal may provide input signals or control signals to selectively activate one or more of the semiconductor switches (35, 37, 135, 137, 235, 237) to prevent damage to one or more motor windings (21, 22, 23) or one or more permanent magnets of the motor 15.

A data processor 10 determines that a short circuit or fault in a particular semiconductor switch (35, 37, 135, 137, 235, 237) is present if the measured collector-emitter voltage or measured source-drain voltage (by the voltage sensor (32, 34)) for the particular semiconductor switch is lower than a minimum threshold (e.g., over at least one complete cycle or waveform of an inverter driver 12 signal) or approaches zero during a sampling period. A driver 12 or a logic control circuit simultaneously activates counterpart switches of like direct current input polarity that are coupled to other phase windings (21, 22, or 23) of the electric motor 15 than the particular semiconductor switch (35, 37, 135, 137, 235, 237) to prevent demagnetization of the permanent magnets in the electric motor 15.

In FIG. 2, the motor 15 is associated with a position sensor 17 (e.g., a position sensor, a resolver or encoder position sensor) that is associated with the motor shaft or the rotor of the motor 15. For example, the position sensor 17 may comprise a magnetic field sensor (e.g., Hall Effect sensor) that detects a shaft or rotor position of a magnet secured to the shaft. The position sensor 17 provides position data, velocity data, or acceleration data for the shaft or rotor of the motor 15. The position data, velocity data or acceleration data can be provided from the position sensor 17 to the data processor 10 (e.g., in a digital format or analog format). For example, the position sensor 17 provides position data for a corresponding time instant to the data processor 10.

In one configuration, the position sensor 17 may comprise one or more of the following: a direct current motor, an optical encoder, a magnetic field sensor (e.g., Hall Effect sensor), magneto-resistive sensor, and a resolver (e.g., a brushless resolver). The output of the sensor is capable of communication with a position and speed processing module (e.g., electronic or software module) in the data processor 10. In one embodiment, the sensor 17 may be coupled to an analog-to-digital converter (not shown) that converts analog position data or velocity data to digital position or velocity data, respectively. In other embodiments, the sensor (e.g., digital position encoder) may provide a digital data output of position data or velocity data for the motor shaft or rotor.

One or more current sensors (59, 159, 259) and one or more winding temperature sensors 19 provide feedback data to the data processor 10 for processing. For example, a current sensor (59, 159, 259) is associated with each phase or winding (21, 22, 23) of the motor 15. The current sensor (59, 159, 259) provides feedback data (e.g., current feedback data or phase output node current, such as $i_a$, $i_b$, $i_c$) among other possible feedback data or signals, for example. In FIG. 2, phase output node current is present at terminals (39, 139, 239, 43, 143, 243), where a current sensor may be assigned to each terminal of a motor winding (21, 22, 23) or to each motor winding (21, 22, 23).

Although one current sensor (59, 159, 259) per phase output node or per motor winding (21, 22, 23) is shown in FIG. 1, in an alternate embodiment the total number of current sensors may be limited to N−1, where N is equal to the number of phases of the electric motor 15. In such an alternate embodiment, the data processor 10 is adapted to estimate or calculate the observed current in the phase output node (e.g., 39 or 43) without a sensor from the other output nodes with sensors (e.g., two current sensors 59, 159) in accordance with electrical network analysis, such as Kirchhoffs law.

As illustrated in FIG. 2, one or more winding temperature sensors 19 provide winding sensor measurements, winding temperature data, winding sensor data, or thermal data, thermal measurements or thermal signals to the data processor 10 for processing. The temperature sensors 19 may provide temperature data or thermal data to rotor magnet temperature estimation module in the data processor 10. In turn, the temperature estimation module in the data processor 10 may scale or adjust one or more outputs of the inverter to compensate for inefficiency or reduced performance associated with thermal degradation.

Other possible feedback data includes, but is not limited to, semiconductor temperature readings of the inverter circuit, three phase voltage data, or other thermal or performance information for the motor 15.

Figure 3:
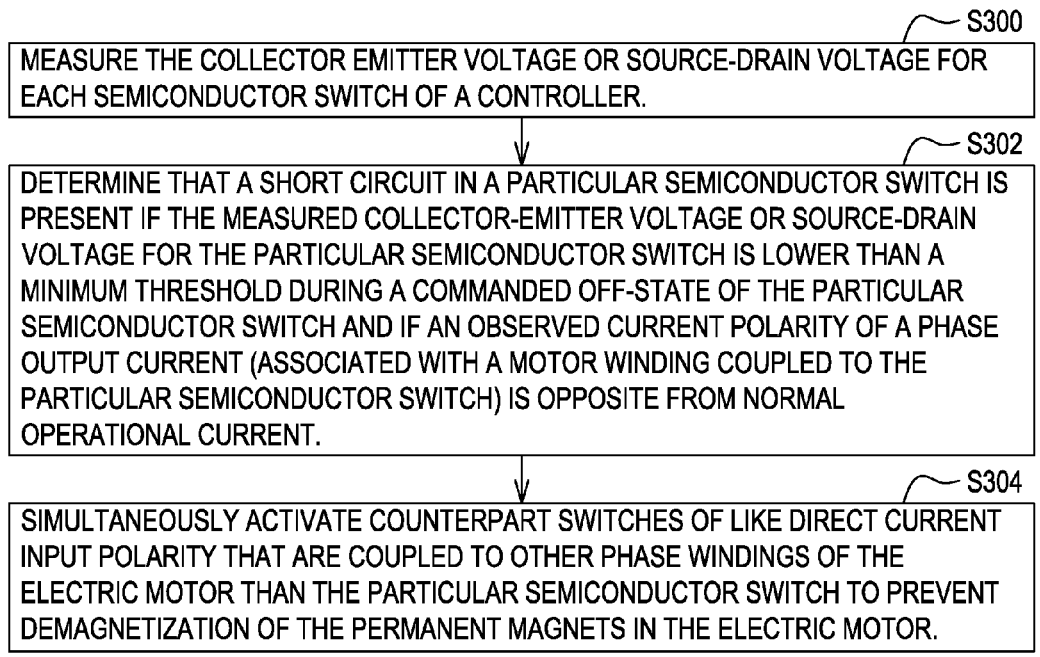
FIG. 3 is a flow chart of a first embodiment of a method for controlling an electrical motor with fault detection.

The method of FIG. 3 begins in step S300.

In step S300, a voltage sensor (32, 34) or another measuring circuit measures the collector-emitter voltage or source-drain voltage for each semiconductor switch (e.g., 81, 82, 181, 182, 281, 282, 35, 37, 135, 137, 235, 237) of a controller (11 or 111).

In step S302, a data processor 10 or logic circuit determines that a short circuit in a particular semiconductor switch (e.g., 81, 82, 181, 182, 281, 282, 35, 37, 135, 137, 235, 237) is present if the measured collector-emitter voltage or source-drain voltage for the particular semiconductor switch is lower than a minimum threshold during a commanded off-state of the particular semiconductor switch (e.g., over at least one complete cycle or waveform of an inverter driver 12 signal) or approaches zero volts for a sampling period and if an observed current associated with the particular semiconductor switch has an opposite polarity from a normal operational polarity. For example, in step S320, a data processor 10 or logic circuit determines that a short circuit in a particular semiconductor switch (e.g., 81, 82, 181, 182, 281, 282; or 35, 37, 135, 137, 235, 237) is present if the measured collector-emitter voltage or source-drain voltage for the particular semiconductor switch is lower than a minimum threshold during a commanded off-state of the particular semiconductor switch or approaches zero volts for a sampling period and if an observed phase output node current (associated with a motor winding (e.g., 44, 46, 48; or 21, 22, 23) coupled to the particular semiconductor switch) has an opposite polarity from a normal operational polarity.

In step S304, the data processor 10, the driver 12 or both simultaneously activate (e.g., turn on) counterpart switches of like direct current (DC) input polarity that are coupled to other phase windings (e.g., 44, 46, 48, 21, 22, 23) of the electric motor (e.g., 45 or 15), other than the particular semiconductor switch, if the short circuit is determined to be present, to prevent damage to the motor, such as demagnetization of the permanent magnets in the electric motor or thermal damage to the windings of the motor. Step S304 may be carried out by various techniques that may be applied alternately or cumulatively. Under a first technique, if the short circuit is detected in a high side switch, then all other high side switches are activated. Under a second technique, if a short circuit is detected in a low side switch, then all other low side switches are activated. Under a third technique, if the data processor 10 detects a short circuit or fault in a high side switch from voltage readings of the voltage sensor 32, then the data processor 10 instructs the driver 12 to activate (e.g., turn on) one or more (e.g., all) other high side switches of the inverter (11 or 111). Under a fourth technique, if the data processor 10 detects a short circuit or fault in a low side switch from voltage readings of the voltage sensor 34, then the data processor 10 instructs the driver 12 to activate (e.g., turn on) one or more (e.g., all) other low side switches of the inverter (11 or 111). Under a fifth technique, if the data processor 10 detects a short circuit or fault in a high side switch from voltage readings of the voltage sensor 32, then the data processor 10 instructs the driver 12 to activate (e.g., turn on) one or more (e.g., all) other high side switches of the inverter (11 or 111), until the direct current power switch 29 is cycled (e.g., deactivated and activated in succession) as observed or directed by the data processor 10. Under a sixth technique, if the data processor 10 detects a short circuit or fault in a low side switch from voltage readings of the voltage sensor 34, then the data processor 10 instructs the driver 12 to activate (e.g., turn on) one or more (e.g., all) other low side switches of the inverter (11 or 111), until the direct current power switch 29 is cycled (e.g., deactivated and activated in succession) as observed or commanded by the data processor 10.

Figure 4:
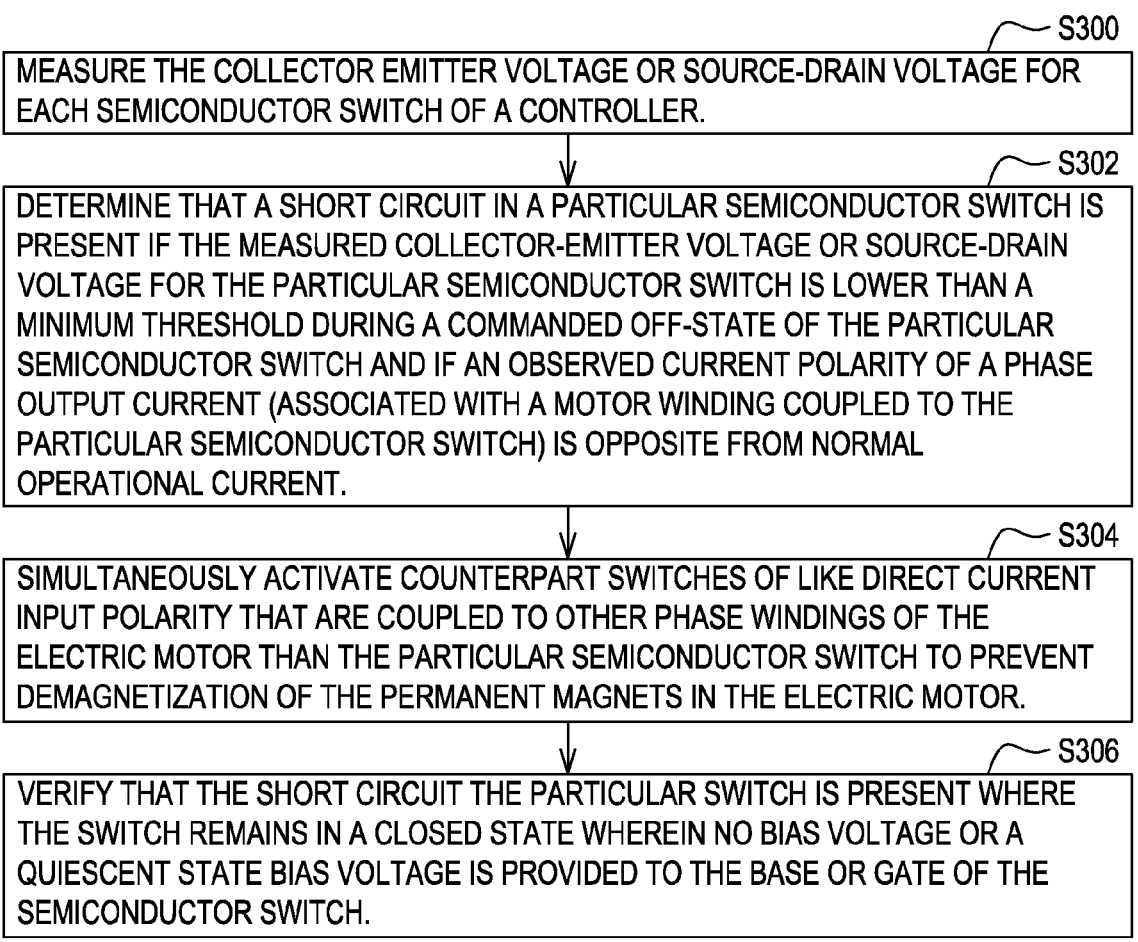
FIG. 4 is a flow chart of a second embodiment of a method for controlling an electrical motor with fault detection.

The method of FIG. 4 is similar to the method of FIG. 3, except the method of FIG. 4 further comprises step S306.

In step S306, the data processor 10 verifies that the short circuit of the particular switch is present where the particular semiconductor switch (e.g., 81, 82, 181, 182, 281, 282, 35, 37, 135, 137, 235, 237) remains in a closed state where no bias voltage or quiescent state bias voltage is provided to the base or gate of the semiconductor switch from the driver 12 or otherwise. For example, the data processor 10 and the driver 12 removes the bias voltage from the base or gate of a particular semiconductor switch (e.g., 81, 82, 181, 182, 281, 282, 35, 37, 135, 137, 235, 237) and then the voltage sensor (32, 34) measures whether the voltage drop across the output terminals (e.g., collector-emitter voltage ($V_{CE}$)) of the switch is below a threshold minimum voltage, is minimal, or approaches zero volts for a sampling period.

Figure 5:
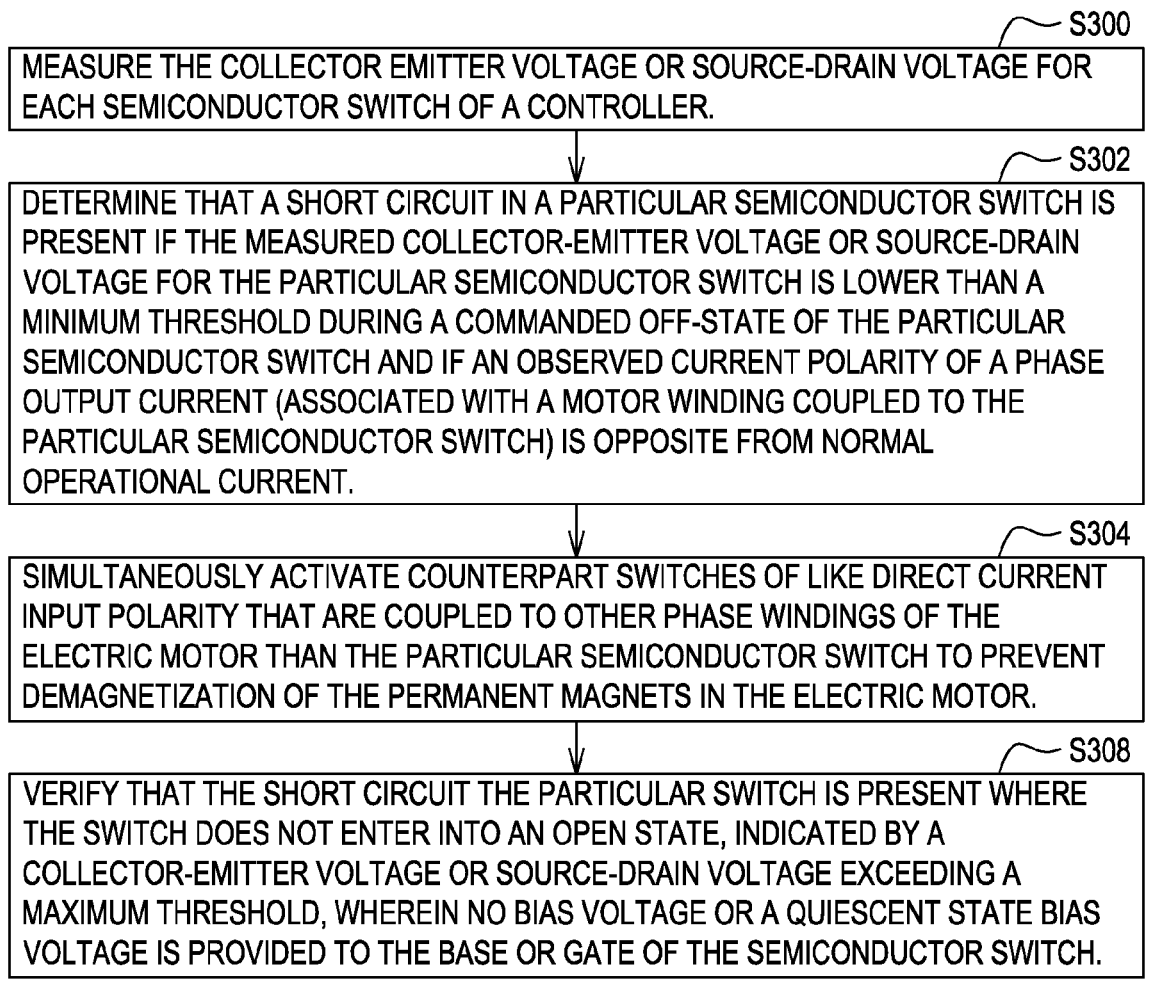
FIG. 5 is a flow chart of a third embodiment of a method for controlling an electrical motor with fault detection.

The method of FIG. 5 is similar to the method of FIG. 3, except the method of FIG. 5 further comprises step S308.

In step S308, the data processor 10 verifies that the short circuit of the particular semiconductor switch (e.g., 81, 82, 181, 182, 281, 282, 35, 37, 135, 137, 235, 237) is present where the particular semiconductor switch does not enter into an open state, indicated by a collector-emitter voltage or source-drain voltage exceeding a maximum threshold, wherein no bias voltage or a quiescent state bias voltage is provided to the base or gate of the semiconductor switch. For example, the switch does not enter the open state and has a short circuit if the data processor 10 and the driver 12 removes the bias voltage from the base or gate of a particular switch while the voltage sensor (32, 34) measures voltage drop across the output terminals of the switch, where the collector-emitter voltage or the source-drain voltage is less than the maximum threshold (e.g., where a greater than typical or normal leakage current (e.g., $I_C$) is flowing between the output terminals of the particular semiconductor switch). Conversely, during normal operation, the switch enters the open state and does not have a short circuit if the data processor 10 and the driver 12 removes the bias voltage from the base or gate of a particular switch while the voltage sensor (32, 34) measures voltage drop across the output terminals of the switch, where the collector-emitter voltage or the source-drain voltage exceeds the maximum threshold (e.g., where a less than typical or normal leakage current (e.g., $I_C$) is flowing between the output terminals of the particular semiconductor switch).

Figure 6:
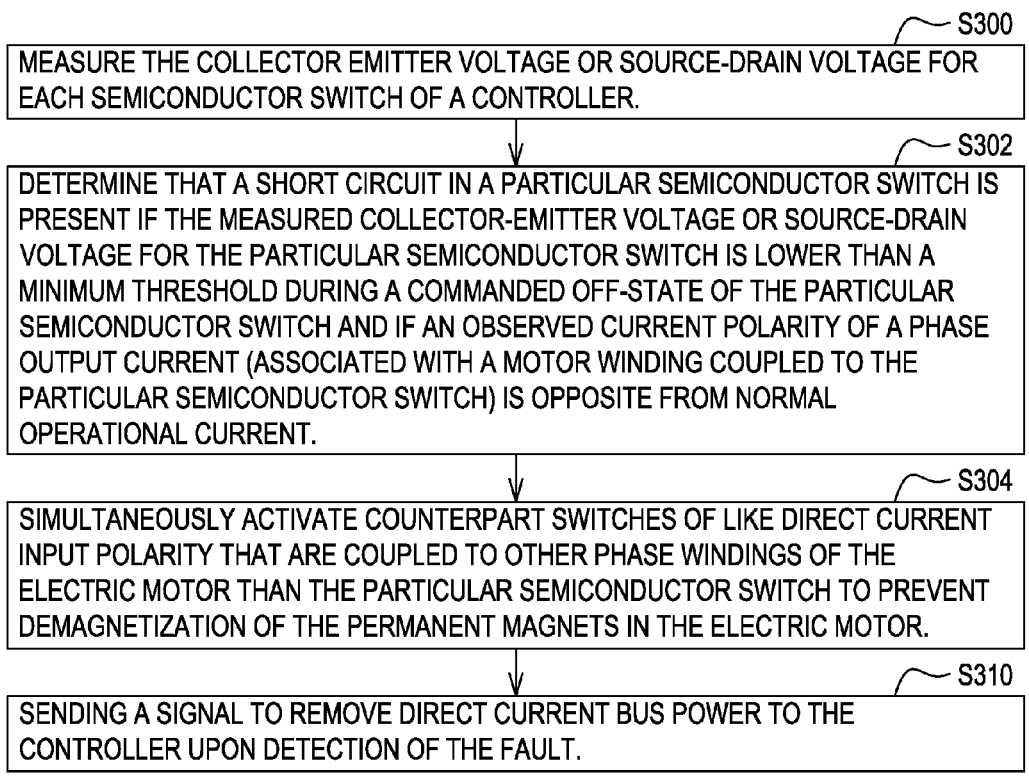
FIG. 6 is a flow chart of a fourth embodiment of a method for controlling an electrical motor with fault detection.

The method of FIG. 6 is similar to the method of FIG. 3, except the method of FIG. 4 further comprises step S310.

In step S310, the data processor 10 sends a signal to remove direct current bus power to the controller upon detection of the fault. For example, the data processor 10 sends a control signal to the direct current power switch 29 to open to remove power to the direct current bus.

Figure 7:
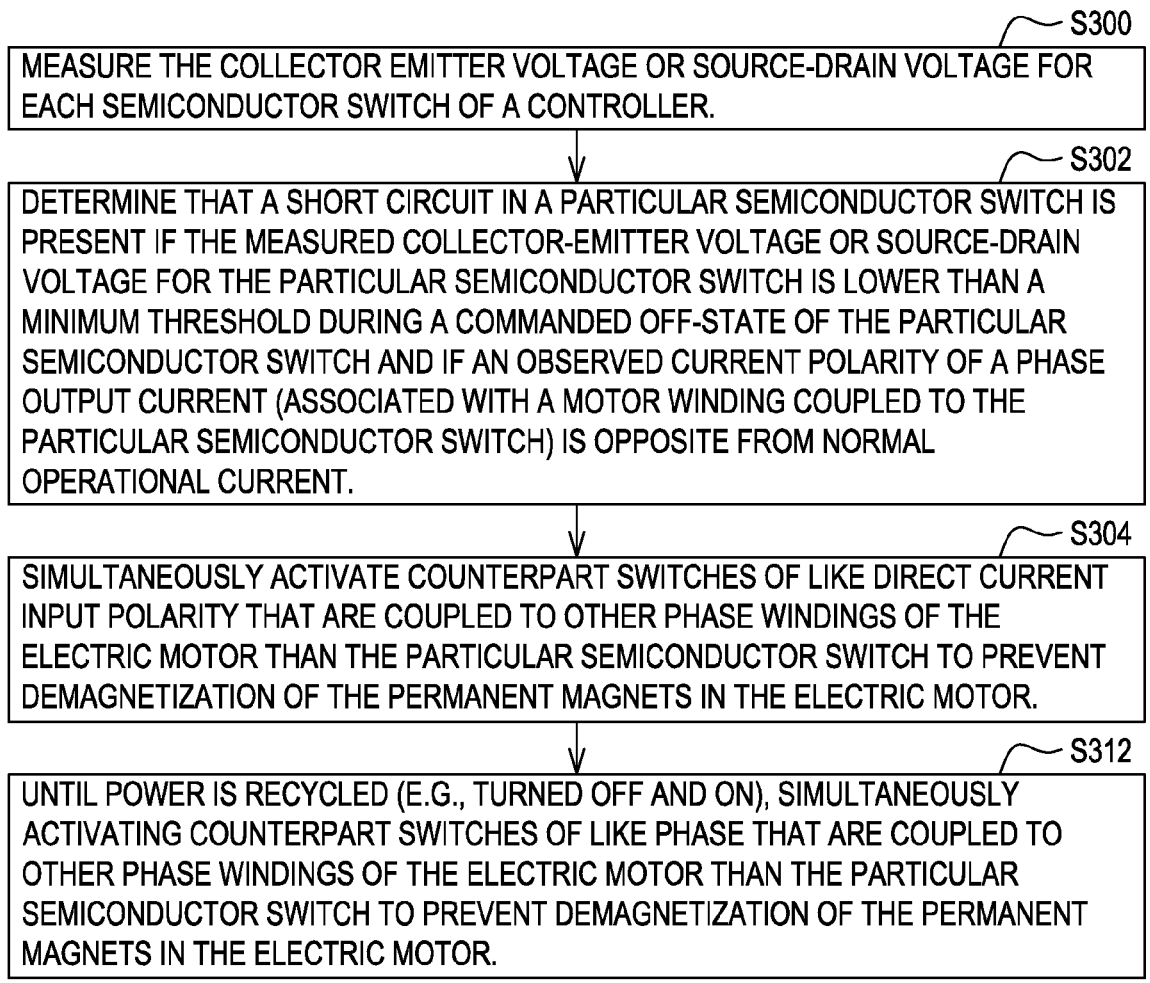
FIG. 7 is a flow chart of a fifth embodiment of a method for controlling an electrical motor with fault detection.

The method of FIG. 7 is similar to the method of FIG. 3, except the method of FIG. 4 further comprises step S312.

In step S312, until power to the controller (e.g., inverter) is recycled (e.g. turned off and on), the data processor 10, the driver 12, or both, simultaneously activate counterpart switches of like direct current input polarity that are coupled to other phase windings (e.g., 44, 46, 48, 21, 22, 23) of the electric motor (e.g., 15 or 45) than the particular semiconductor switch to prevent damage to the motor, such as thermal damage to one or more motor windings or demagnetization of one or more permanent magnets in the electric motor (e.g., 15 or 45).

Figure 8:
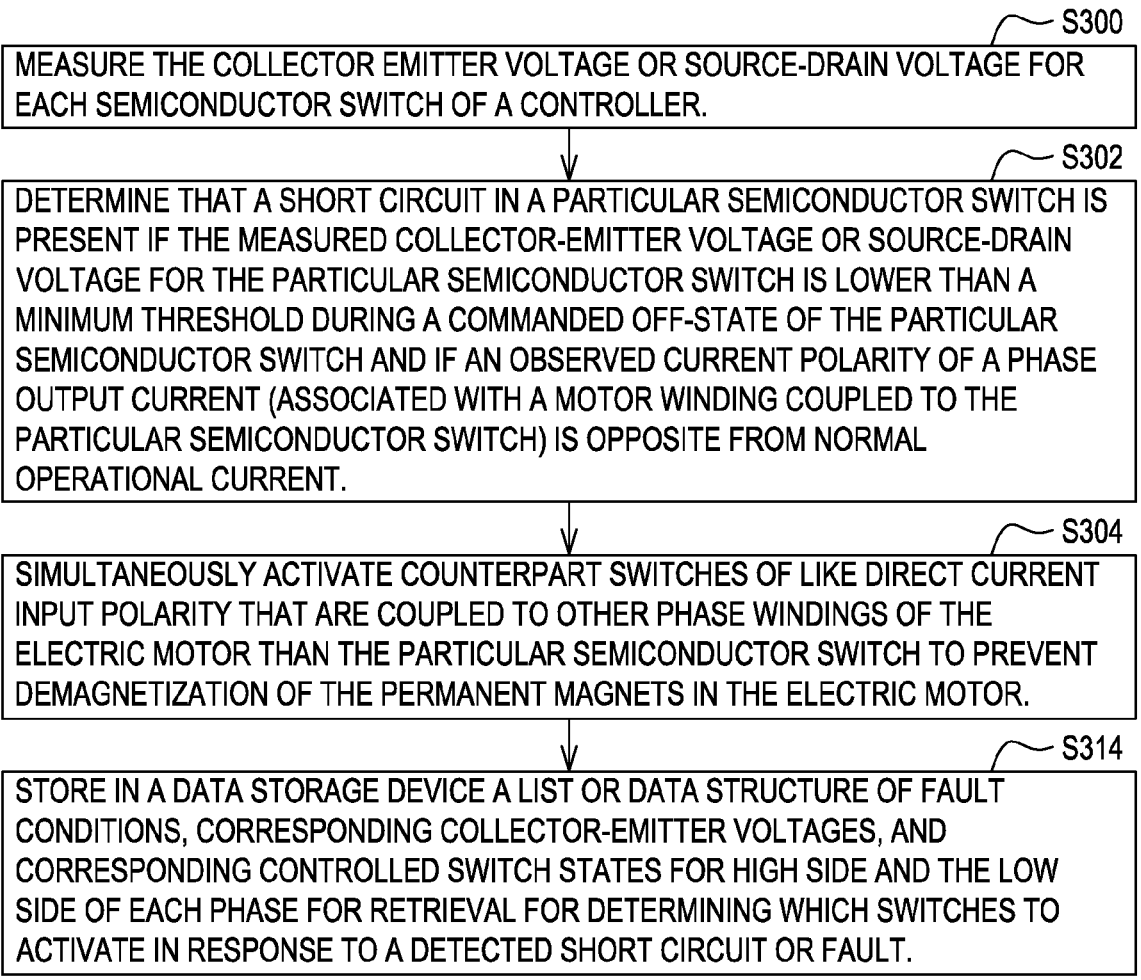
FIG. 8 is a flow chart of a sixth embodiment of a method for controlling an electrical motor with fault detection.

The method of FIG. 8 is similar to the method of FIG. 3, except the method of FIG. 4 further comprises step S314.

In step S314, the data processor 10 stores one or more of the following items in a data storage device 67: a list, file, inverted file, database, look-up table, or data structure of fault conditions, corresponding collector-emitter voltages, and corresponding controlled switch states for high side and low side of each phase for retrieval for determining which switches to activate in response to a detected short circuit or fault.

FIG. 9 is an illustrative table of voltage states of semiconductor switches, corresponding output current for phase output nodes, corresponding faults detected, and corresponding corrective actions. The illustrative table may be stored as a look-up table, a file, an inverted file, a relational database, or another data structure in the data storage device 67. The same illustrative table may be applied, serially or, in some cases, simultaneously, to each phase of the inverter circuit or controller (11 or 111). The first column 901 specifies the current polarity of the phase output node or at a winding terminal of the motor winding. The second column 902 specifies a corresponding high side gate command or logic level signal applied to a semiconductor switch of a given phase of the inverter, whereas the third column 903 specifies the low side gate command or logic level signal applied to a semiconductor switch of a given phase of the inverter. The fourth column 904 specifies the high side collector-emitter voltage (VCE) for a high side semiconductor switch, whereas the fifth column 905 specifies the low side collector-emitter voltage (VCE) for a low side semiconductor switch. The sixth column 906 specifies the corresponding condition, including any fault or short circuit states of a semiconductor switch or associated diode coupled to the semiconductor switches output terminals. The seventh column 907 specifies the corresponding response to prevent damage to the controller or the motor. Each row (951, 952, 953, 954, 955, 956 and 957) provides a set of corresponding states that are associated with a respective condition in the sixth column 906, a respective response in the seventh column 907, or both.

In the first column 901, if the normal current polarity is negative (−), the opposite current polarity is positive (+), and vice versa. Although the second column 902 and the third column 903 each specify a gate command, a base command may be substituted for the gate command. The driver 12 outputs the gate or base commands as previously described. Similarly, the reference to the "IGBT" or insulated gate bipolar transistor may be substituted for another suitable semiconductor device or semiconductor switch (e.g., 81, 82, 181, 182, 281, 282).

The method and system is well-suited for detecting a fault or short circuit in particular semiconductor switch of the inverter or controller to prevent damage to the motor connected to the inverter. For example, upon detection of a fault or short circuit in a semiconductor switch, the data processor may activate other semiconductor switches of like direct current polarity to eliminate or prevent an asymmetric current flow between two or more phases of the motor that may lead to motor damage or degradation of permanent magnets of the motor.

Having described the preferred embodiment, it will become apparent that various modifications can be made without departing from the scope of the invention as defined in the accompanying claims.

The following is claimed:

1. A method for providing fault protection of a controller of an electric motor, the method comprising:
   measuring the collector-emitter voltage or source-drain voltage for each semiconductor switch of a controller;
   determining that a short circuit in a particular semiconductor switch is present if the measured collector-emitter voltage or source-drain voltage for the particular semiconductor switch is lower than a minimum threshold during a commanded off-state of the particular semiconductor switch and if an observed current associated with the particular semiconductor switch has an opposite polarity from a normal operational polarity; and
   simultaneously activating counterpart switches of like direct current input polarity that are coupled to other phase windings of the electric motor, other than the particular semiconductor switch, if the short circuit is determined to be present, to protect the motor from damage associated with asymmetric current flow in its windings.

2. The method according to claim 1 wherein the short circuit in the particular semiconductor switch is a high-side switch of one phase of the controller and wherein the activated counterpart switches of like direct current input polarity comprise high-side switches of the other phase or phases of the output of the controller.

3. The method according to claim 1 wherein the short circuit in the particular semiconductor switch is a low-side switch of one phase of the controller and wherein the activated counterpart switches of like direct current input polarity comprise low-side switches of other phase or phases of the output of the controller.

4. The method according to claim 1 further comprising:
   verifying that the short circuit the particular switch is present where the particular semiconductor switch remains in a closed state wherein no bias voltage or a quiescent state bias voltage is provided to the base or gate of the particular semiconductor switch.

5. The method according to claim 1 further comprising:
   verifying that the short circuit the particular semiconductor switch is present where the particular semiconductor switch does not enter into an open state, indicated by a collector-emitter voltage or source-drain voltage exceeding a maximum threshold, wherein no bias voltage or a quiescent state bias voltage is provided to the base or gate of the particular semiconductor switch.

6. The method according to claim 1 further comprising:
   sending a signal to remove direct current bus power to the controller upon detection of the fault.

7. The method according to claim 1 further comprising:
   until power is cycled, simultaneously activating counterpart switches of like direct current input polarity that are coupled to other phase windings of the electric motor, than the particular semiconductor switch, to prevent thermal data to one or more windings or demagnetization of one or more permanent magnets in the electric motor.

8. The method according to claim 1 wherein the activating further comprises:
   storing in a data storage device a list, look-up table, file, inverted file, database or data structure of fault conditions, corresponding collector-emitter voltages, and corresponding controlled switch states for high side and the low side of each phase for retrieval for determining which switches to activate in response to a detected short circuit or fault in the particular semiconductor switch.

9. The method according to claim 1 wherein the determining further comprises determining that a short circuit in a particular semiconductor switch is present if the measured collector-emitter voltage or source-drain voltage for the particular semiconductor switch is lower than a minimum threshold over at least one complete cycle or waveform of an inverter driver signal.

10. A system for providing fault protection of a controller of an electric motor, the system comprising:
   a first pair of semiconductor switches comprising a high side switch and a low side switch for a first phase of the controller;
   a second pair of semiconductor switches comprising a high side switch and a low side switch for a second phase of the controller;
   a direct current voltage bus coupled to collector and emitter terminals, or source and drain terminals, of the semiconductor switches;
   a measuring circuit for measuring the collector-emitter voltage for each semiconductor switch of the controller;
   a data processor for determining that a short circuit in a particular semiconductor switch, among the semiconductor switches, is present if the measured collector-emitter voltage or measured source-drain voltage for the particular semiconductor switch is lower than a minimum threshold during a commanded off-state of the particular semiconductor switch and if an observed current associated with the particular semiconductor switch has an opposite polarity from a normal operational polarity; and
   a driver, controlled by the data processor, for simultaneously activating one or more counterpart switches of like direct current input polarity that are coupled to at least one other phase winding of the electric motor, other than the particular semiconductor switch, if the short circuit is determined to be present, to protect the motor from asymmetric current flow in its windings.

11. The system according to claim 10 wherein the short circuit in the particular semiconductor switch is the high side switch of the first phase of the controller and wherein the one or more activated counterpart switches of like direct current input polarity comprises the high-side switch of the second phase of the output of the controller.

12. The system according to claim 10 wherein the short circuit in the particular semiconductor switch is a low-side switch of a first phase and wherein the one or more activated counterpart switches of like direct current input polarity comprises the low-side switch of the second phase of the output of the controller.

13. The system according to claim 10 further comprising:
   the data processor adapted to verify that the short circuit the particular switch is present where the switch remains in a closed state wherein no bias voltage or a quiescent state bias voltage is provided to the base or gate of the semiconductor switch.

14. The system according to claim 10 further comprising:
   the data processor adapted to verify that the short circuit the particular switch is present where the switch does not enter into an open state, indicated by a collector-emitter voltage exceeding a maximum threshold, wherein no bias voltage or a quiescent state bias voltage is provided to the base or gate of the semiconductor switch.

15. The system according to claim 10 further comprising:
   the data processor further comprising a communications device for sending a control signal to a direct current power switch to remove direct current bus power to the controller upon detection of the short circuit or fault.

16. The system according to claim 10 further comprising:
   until power is cycled, the driver, which is controlled by the data processor, is adapted to simultaneously activate counterpart switches of like direct current polarity that are coupled to other phase windings of the electric motor other than the particular semiconductor switch to prevent damage to the electric motor.

17. The system according to claim 10 further comprising:
   a data storage device for storing a data structure of respective fault conditions, corresponding collector-emitter voltages, and corresponding controlled switch states for high side and the low side of each phase for retrieval and use by the logic control circuit for determining which switches to activate in response to a detected short circuit or fault, where the data structure comprises at least one of a file, a database, a look-up table, an inverted file, a group of records, a list, or a chart.

18. The system according to claim 10 wherein the voltage measuring circuit comprises a high impedance measuring circuit that is switchably coupled across terminals of the low side switching semiconductor or the high-side switching semiconductor for each phase.

19. The system according to claim 10 wherein the data processor is adapted to determine that a short circuit in a particular semiconductor switch is present if the measured collector-emitter voltage or source-drain voltage for the particular semiconductor switch is lower than a minimum threshold, or approaches zero volts, over at least one complete cycle or waveform of an inverter driver signal.

20. The system according to claim 10 further comprising:
   a plurality of current sensors to measure the observed current associated with the particular semiconductor switch, the total number of the current sensors being limited to N−1, where N is equal to the number of phases of the electric motor; and
   the data processor adapted to estimate the observed current for one phase output node without one of said plurality of sensors, the estimation executed in accordance with electrical network analysis.

* * * * *